Figure 1:
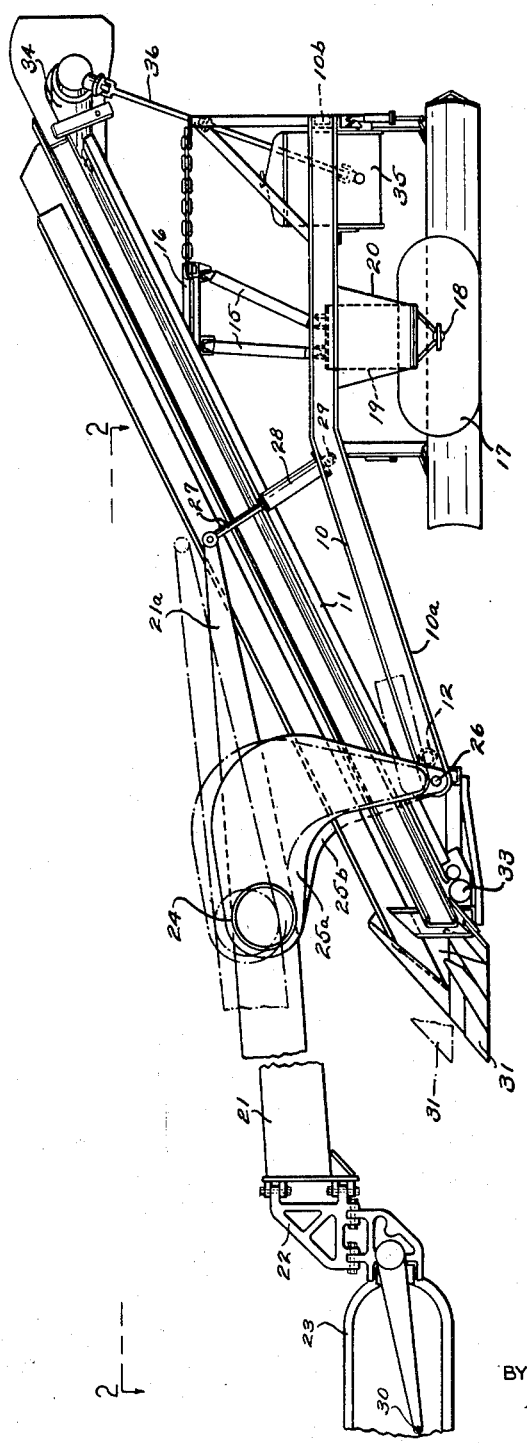

Dec. 11, 1956  R. Q. ARMINGTON  2,773,319
CONVEYOR LOADER HITCH
Original Filed Oct. 4, 1947  2 Sheets—Sheet 1

INVENTOR
RAYMOND Q. ARMINGTON
BY
Hyde, Meyer, Baldwin & Doran
ATTORNEYS

United States Patent Office 2,773,319
Patented Dec. 11, 1956

2,773,319

CONVEYOR LOADER HITCH

Raymond Q. Armington, Shaker Heights, Ohio, assignor, by mesne assignments, to General Motors Corporation, Detroit, Mich., a corporation of Delaware Original application October 4, 1947, Serial No. 777,887. Divided and this application June 17, 1953, Serial No. 362,284

4 Claims. (Cl. 37—110)

This invention relates to improvements in a hitch and more particularly to a hitch for a conveyor loader adapted to dig and elevate earth as it moves along a path.

This application is a division of my copending U. S. patent application, Serial No. 777,887, now abandoned, for "Conveyor Loader," filed October 4, 1947.

An object of the present invention is to provide novel means for raising and lowering the cutting blade on an earth cutting machine such as a conveyor loader.

Another object of the present invention is to provide in a conveyor loader greater leverage for vertically moving the cutting blade and clearer view of the cutting action.

Other features of this invention reside in the arrangement and design of the parts for carrying out their appropriate functions.

Other objects and advantages of this invention will be apparent from the accompanying drawings and description and the essential features will be set forth in the appended claims.

Figure 2:
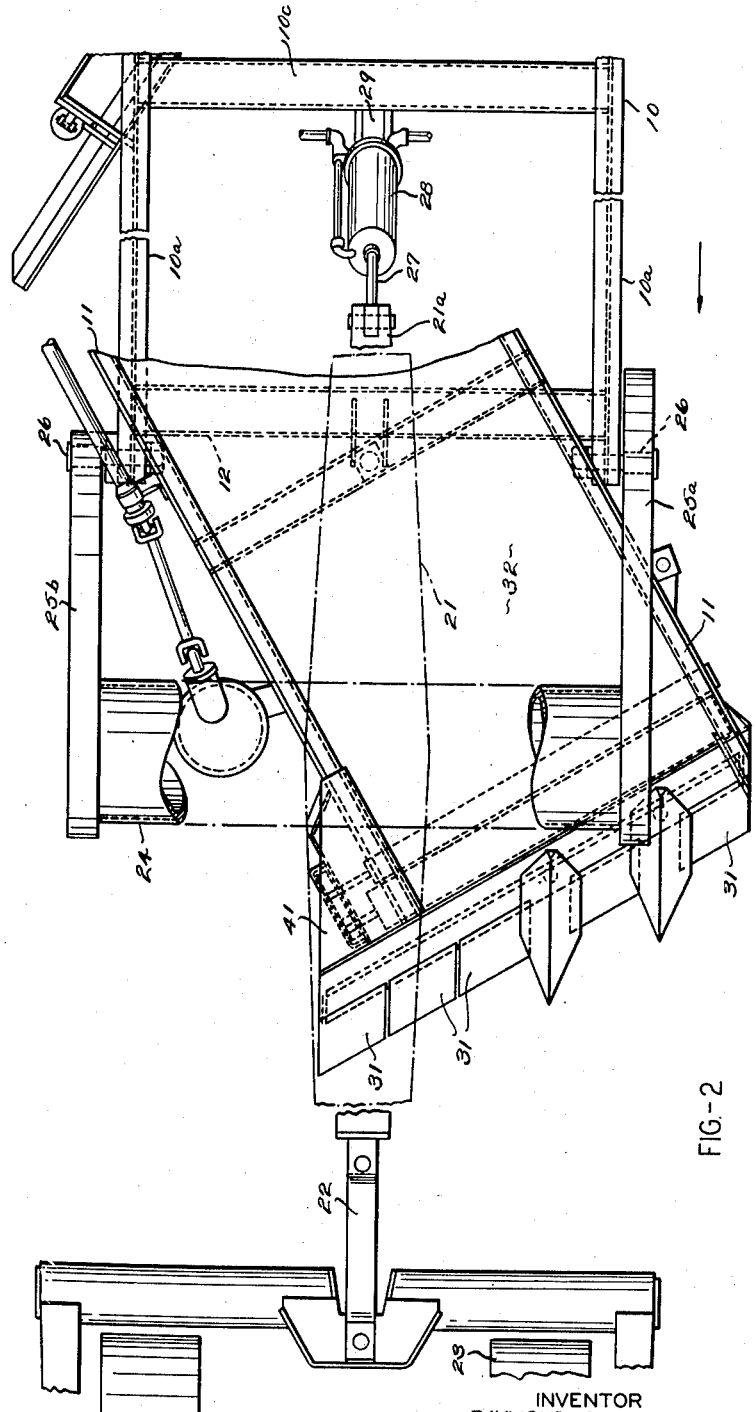

In the drawings,

Fig. 1 is a side elevational view of the hitch in the present invention connecting the conveyor loader on the right and a tractor on the left; while Fig. 2 is an enlarged fragmental plan view taken generally along the line 2—2 of Fig. 1 with certain parts broken away to more thoroughly show the construction.

While the hitch of the present invention might be adapted to various types of machines having an earth cutting blade near the front end of a trailer vehicle, it has been chosen to show the same as connecting a tractor and conveyor loader.

The conveyor loader comprises a main frame 10 having parallel side frame members 10a, a rear cross frame member 10b and other suitable cross members represented by 10c to give rigidity to the frame. A superstructure 11 is mounted on the frame with the lower end of the superstructure resting on and secured to a cross member 12 near the front end which is rigidly connected between the side frame members 10a. The upper end of the superstructure 11 is supported on struts 15, the lower ends of which are connected to the frame 10 and upper ends of which are connected to a beam 16 underlying and secured to the superstructure 11.

Rolling support means is provided for supporting the rear ends of frame 10 for movement along the ground. In the present instance, two endless tracks 17 are provided on opposite sides of the loader frame, each track being mounted on and oscillatable about a shaft 18 with shaft 18 connected to the frame 10 by suitable frame members 19 and 20.

Means is provided for supporting the forward end of the frame 10 which takes the form of a drawbar 21 connected at its forward end by means of a hitch means 22 with a horizontal pivot 30 to a tractor 23, only a portion of which is shown. At an intermediate portion along the length of the drawbar, there is a beam or torque tube 24 extending crosswise or at right angles to the drawbar and rigid therewith located rearwardly of pivot 30. Rigidly connected to opposite ends of this torque tube are hanger means or members 25a and 25b extending downwardly therefrom. These are generally of inverted L-shape and carry at their lower ends horizontal pivot connections 26 by which they are pivotally attached to the forward portion of side frame members 10a. The rear end of the drawbar, indicated at 21a, is pivotally connected by a clevis to a power means comprising piston rod 27 and a hydraulic jack 28 which in turn has a horizontal pivotal trunnion mounting 29 on the frame 10.

The superstructure 11 has a conveyor belt 32, preferably of the endless belt type, passing over a tail pulley 33 near the ground and a head pulley 34 at its upper end with a motor 35 mounted on frame 10 for driving shaft 36 which has a driving connection with the pulley 34.

A ground cutting blade 31 is rigidly supported on the forward or left end of the superstructure 11 and extends crosswise of the conveyor 32 immediately in front of the tail pulley 33. A small portion of the blade 31 extends a little to the right of the conveyor belt, as viewed when facing toward the left or front in Fig. 2, but this portion of the blade is merely to clean up the previously cut strip rather than for digging action. A mold board 41 on the superstructure 11 serves to transfer earth from this wing of the blade onto the conveyor 32.

It results from the above construction that operation of the hydraulic jack 28, by hydraulic control means not shown, raises and lowers the rear end of the drawbar 21a relative to the frame 10. The oscillating motion of the drawbar occurs about the horizontal pivot 30 where the hitch is connected to the tractor 23. The hitch means 22 is rigid with regard to transmitting motion in a vertical plane. During this motion, the main frame 10 oscillates about the shaft 18. The result is to raise or lower the parts supporting frame 10 from drawbar 21, such as torque tube 24 and the hanger members 25a and 25b, so as to move the parts respectively to the dot-dash or solid line positions indicated in Fig. 1 and to raise or lower the position of cutting blade 31.

The operator is thus enabled to control easily the depth of cut made by blade 31 by manipulating the hydraulic jack 28. However, if the hydraulic jack 28 were located in front of the torque tube 24, a mechanical disadvantage would result since the length of the lever arm from the hydraulic jack to the pivot 30 on the tractor would then be substantially shorter than the lever arm between pivots 26 and 30. However, in the present embodiment, a substantial mechanical advantage and greater leverage is obtained from the present design since the lever arm between pivot 30 and hydraulic jack 28 is substantially greater than the lever arm between pivots 26 and 30. Also, locating the hydraulic jack 28 in the rearward location of Fig. 1 provides in the present construction a much clearer view of the cutting action of the blade 31 without the obstruction of a hydraulic jack on the drawbar ahead of the torque tube 24.

It should be readily understood that the words "rolling support means" as applied to a tractor 23 with an endless track and to the endless tracks 17, includes tractor treads or tracks, wheels, or any other equivalent structure.

If the loader is of the self powered type, the tractor 23 can be replaced by any equivalent rolling support means for supporting the front of the hitch means 22 so as to provide the proper vertical movement for blade 31.

Various changes in details and arrangement of parts can be made by one skilled in the art without departing from the spirit of this invention or the scope of the appended claims.

What I claim is:

1. In apparatus of the class described, the combination of a drawbar member, rolling support means for supporting by a horizontally disposed pivot the forward end of said drawbar member, a frame member, rolling support means supporting said frame member, hanger members straddling said drawbar member and extending downwardly therefrom, said hanger members connecting said drawbar member at a point intermediate its fore and aft length to a forward portion of said frame member and being connected by a transversely extending horizontal pivot to one of said members, a cutting blade carried by said frame member at the forward end thereof ahead of the connection with said hanger members, and power means connected between said frame member and the rear end of said drawbar member a substantial distance aft of said hanger members for raising and lowering said drawbar member by substantial mechanical advantage by oscillating said frame member about its pivotal support on its rolling support means, the parts of said apparatus being oriented so that the operator has a clear view of the cutting action at said blade.

2. In apparatus, as set forth in claim 1, said rolling support means designed for supporting an operator for said apparatus, said pivotal connection at the forward end of said drawbar member and said rolling support means and the operator location being generally in vertical alignment so that the operator has a clear view of the cutting action at said blade.

3. In apparatus, as set forth in claim 1, said drawbar member having rigid therewith a torque tube transversely extending on opposite sides thereof, each of said hanger members being of generally inverted L-shape, rigidly connected at its upper end to one of the outer ends of said drawbar member torque tube, and pivotally connected at its lower end to straddle the frame member behind and generally in horizontal alignment with said blade.

4. In apparatus, as set forth in claim 1, a conveyor mounted on said frame member and extending upwardly and rearwardly from a zone near the ground behind said blade, said hanger members connected to said frame member out of the path of travel of said conveyor so that flow thereon is not interfered therewith and the apparatus operator has a good view thereof, said frame member not extending substantially above said blade and conveyor, said drawbar member located substantially above said blade and the leading end of said conveyor to provide a clear view.

References Cited in the file of this patent

UNITED STATES PATENTS

| | | |
|---|---|---|
| 1,858,634 | Maloon | May 17, 1932 |
| 1,958,195 | Le Bleu | May 8, 1934 |
| 2,136,102 | Heil | Nov. 8, 1938 |
| 2,386,187 | Armington et al. | Oct. 9, 1945 |
| 2,541,853 | Armington et al. | Feb. 13, 1951 |